Figure 2:
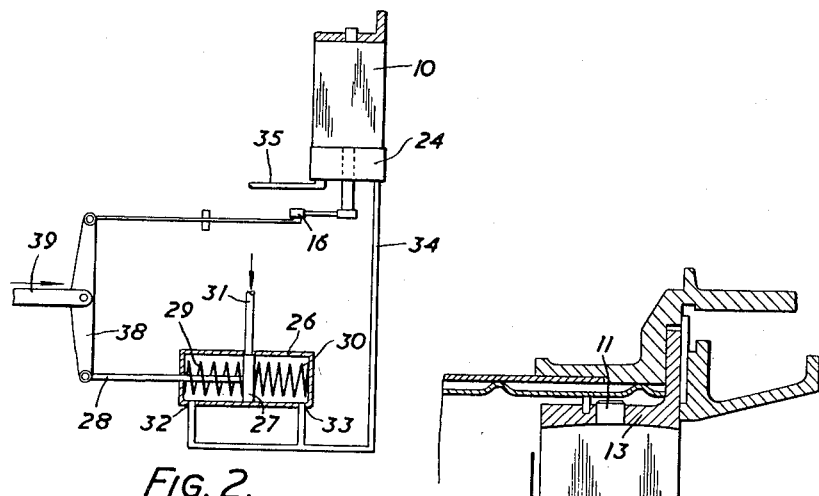

March 21, 1961  R. A. GILBERT  2,976,015
TURBINE STATOR BLADE RINGS
Filed June 16, 1958

INVENTOR
RONALD A. GILBERT

BY
Watson, Cole, Grindle + Watson

ATTORNEYS

United States Patent Office
2,976,015
Patented Mar. 21, 1961

2,976,015

TURBINE STATOR BLADE RINGS

Ronald A. Gilbert, North Wembley, England, assignor to D. Napier & Son Limited, London, England, a British company Filed June 16, 1958, Ser. No. 742,088

9 Claims. (Cl. 253—78)

This invention relates to turbine stator blade rings of the variable incidence type, that is to say of the type including a ring of blades each blade being capable of pivotal movement about a longitudinal axis which is substantially radial to the rotary axis of the turbine. Thus it will be understood that the invention can equally be applied to blade rings where the pivotal axes of the blades are slightly inclined to true radii from the rotary axis.

In such blade rings means are normally provided for adjusting the positions of the individual blades and it is an object of the present invention to provide means for locking the blades in any desired position of angular adjustment and for unlocking them when further adjustment is required.

According to the present invention a turbine stator blade assembly of the type referred to includes a fixed guide element with which a part of each blade makes a close fit, and means for delivering fluid, at a temperature different from that of the gases passing through the blade ring, into close thermal contact with one of the closely fitting parts, to cause differential thermal expansion between the parts, so as to lock or free the parts for relative movement.

It will be appreciated that the fixed guide element may be a close fit with a part of each blade itself, or with a part rigidly secured to the blade such as the blade root, or with one of the spigots which are normally provided at opposite ends of the pivoting blades.

Since the gases passing through the blade ring will normally be at high temperature it is convenient to use a relatively cool fluid and according to a preferred feature of the invention the fluid is appreciably cooler than the hot gases in the turbine and the arrangement is such that the closely fitting parts are freed to allow each blade to twist on its longitudinal axis when the cooling fluid is supplied.

In a preferred construction the assembly includes a common locking ring contacting one end of each of the blades, this ring being mounted in an annular groove so as to be capable of limited expansion and contraction in a radial direction, and in which the cooling fluid is admitted to the annular chamber formed by the locking ring and the walls of the groove.

According to a preferred feature of the invention the assembly includes automatic control means comprising valve mechanism controlling the supply of fluid to the close fitting parts, and differential mechanism whose input member constitutes the operating control member, one of the output members of the differential mechanism being connected to this valve and to a resilient self-centering device, while the other is connected to mechanism arranged to adjust the angles of incidence of the blades.

Figure 1:
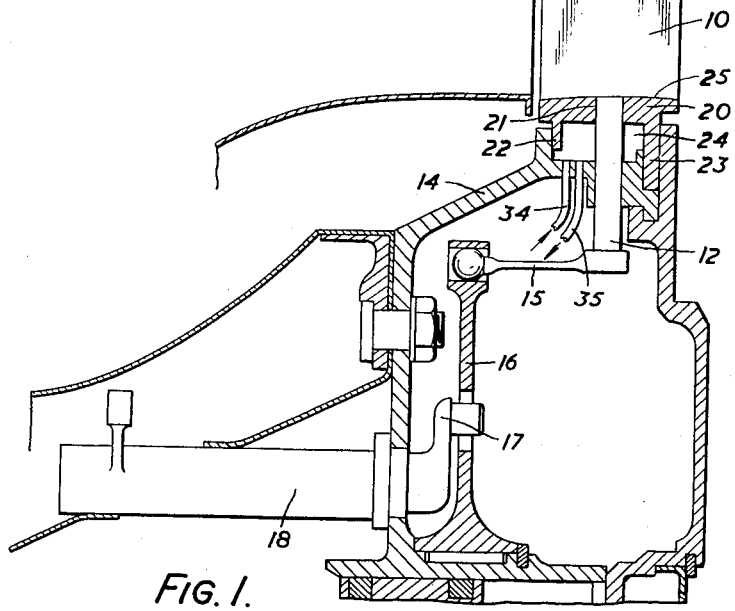

The invention may be performed in various different ways but one specific embodiment will now be described by way of example with reference to the accompanying drawings, in which Figure 1 is a side sectional elevation through part of the turbine of a gas turbine engine, showing the inlet nozzle blades, and Figure 2 is a diagrammatic illustration of the control mechanism therefor.

In this example the invention is applied to a ring of variable incidence blades constituting an inlet nozzle ring of a turbine forming part of a gas turbine engine. The incidence angle of the blades is adjustable primarily to provide a variable area nozzle. The blade ring assembly comprises a ring of blades 10 each provided with a spigot 11, 12 at root and tip, coaxial with one another, and supported in a series of bores or drillings provided respectively in a shroud ring 13 closely surrounding the outer tips of the blades and in a fixed annular frame member 14 lying within the blade ring. The inner ends of the spigots 12 on the roots of the blades extend inwards through the drillings in the frame member 14 and are rigidly connected to radial arms 15, which are in turn connected to a common operating ring 16, actuated by a crank 17 on a shaft 18. Rotational movement of the ring 16 about the rotary axis of the turbine thus simultaneously adjusts the angular positions of all the individual blades 10 on their pivotal axes.

A common locking ring 20 is provided in contact with the inner edge surface of each blade. This ring is formed with a series of circumferentially spaced drillings 21 through which the inner spigots 12 pass, and on its inner surface remote from the blades it is provided with two spaced inwardly directed flanges or ribs 22, 23 which extend into an outward facing annular groove in the frame member referred to, the ribs being in close sliding contact with the opposite walls of this annular groove. The locking ring 20 with the ribs 22, 23 thus forms with the annular groove a substantially closed annular chamber 24. Means are provided for admitting a cooling fluid, preferably cooling air derived from the air compressor of the gas turbine engine, to this annular chamber 24, and for permitting such air to escape at a restricted rate. The locking ring itself is so formed and dimensioned that when the turbine is in operation and when the blades and the locking ring have both reached a constant temperature, the outer surface 25 of the locking ring is a close interference fit with the adjacent edges of the blades and thus locks these blades in the selected position of angular adjustment. When cooling fluid is admitted to the annular chamber 24 however, the locking ring is cooled and consequently contracts away from the inner edges of the blades, thus freeing the blades for angular adjustment. The outer surface of the locking ring, and the inner edges of the blades, lie on a spherical surface, centred on the rotary axis of the turbine. The cooperating surfaces of the blades and the shroud ring 13 also lie on a spherical surface.

The control of cooling fluid to the annular chamber is preferably interconnected with the mechanism controlling the angular adjustment of the blades so as to be fully automatic. Thus in the arrangement illustrated in Figure 2 a fluid control valve 26 is provided comprising a valve cylinder containing a valve piston 27 actuated by a rod 28 passing through one end of the chamber and having compression springs 29, 30 at both ends of the chamber urging the piston towards its central position. A cool air entry port 31 from the air compressor is connected to a mid-point in the length of the chamber so as to be closed by the piston when in its central position. Outlet ports 32, 33 are provided at both opposite ends of the chamber, both these outlet ports being connected to a cooling fluid supply line 34 leading to the annular chamber 24 referred to above. A fluid outlet passage 35 leads from the chamber 24 to the gas turbine exhaust passage. Thus if the valve piston is moved in either direction away from its central position cooling fluid will be admitted to the annular chamber 24 to release the blades 10.

The control rod 28 of this fluid valve is connected to one end of a floating link 36, the opposite end of which is connected to the operating sleeve 16 for controlling the angular attitude of the blades. An intermediate point in the length of the floating lever 38 is connected to a manual operating lever 39.

Thus in operation with the blades locked by the locking ring 20, any movement of the manual control lever 39 in either direction will move the valve piston 27 from its central position to admit cooling fluid to the annular chamber 24. Cooling fluid will continue to be supplied to this chamber until such time as the locking ring contracts to free the blades. The compression springs 29, 30 within the valve chamber will at all times tend to urge the piston towards its central position, and as soon as the blades are free to pivot, the floating link will rock, thus adjusting the angular position of the blades and simultaneously returning the piston to its central position. The supply of cooling fluid is thus interrupted, and as the temperature of the locking ring again rises, it expands into close contact with the blades.

What I claim as my invention and desire to secure by Letters Patent is:

1. A turbine stator blade assembly including a frame member, and relatively closely fitting parts including a ring of variable incidence stator blades, each blade being mounted on said frame member for pivotal movement about a longitudinal axis which is substantially radial to the rotary axis of the turbine, and a guide element of thermally expansible material, means mounting said element concentrically to said ring of blades for expansion and contraction relative to said blades into and from locking frictional engagement with said blades, and means for selectively supplying or interrupting the delivery of a cooling fluid at a temperature different from that of the gases passing through the blade ring, into close thermal contact with at least one of said closely fitting parts, namely, said guide element and the adjacent portions of the blades, to cause differential thermal expansion between the parts, so as to free the parts for relative movement and permit each blade to rotate on its longitudinal axis when the cooling fluid is supplied, the said parts being so dimensioned that when hot gases are passed through the turbine assembly and in the absence of such cooling fluid the parts are frictionally locked against relative movement.

2. A turbine stator blade assembly as claimed in claim 1 including a stator casing a common locking ring contacting one end of each of the blades and constituting the said guide element, this ring being mounted in an annular groove in the casing so as to be capable of limited expansion and contraction in a radial direction, and in which the means for controlling the delivery of the cooling fluid includes the fluid supply passage communicating with the annular chamber formed by the locking ring and the walls of the groove.

3. A turbine stator blade assembly as claimed in claim 1 including automatic control means comprising valve mechanism controlling the supply of fluid to the close fitting parts a resilient self-centering device, and mechanism operatively connected to the blades to adjust the angle of incidence thereof, and differential mechanism including an input and two output members, input member constituting the operating control member while one of the output members of the differential mechanism is connected to the said valve and to the resilient self-centering device, while the other output member is connected to the said mechanism arranged to adjust the angles of incidence of the blades.

4. A turbine stator blade assembly as claimed in claim 1 in which the cooperating surfaces of each blade and of the guide element are of spherical curvature, the spherical centre being positioned on the main turbine axis.

5. A turbine stator blade assembly including a frame member, and relatively closely fitting parts including a ring of variable incidence stator blades, each blade being connected to said frame member for pivotal movement about a longitudinal axis which is substantially radial to the rotary axis of the turbine, and a fixed guide element of thermally expansible material, means mounting said element concentrically to said blades for expansion and contraction relative to said blades into and from frictional engagement with said blades, and means for selectively supplying or interrupting the delivery of a cooling fluid to said blades, the cooling fluid being at a temperature different from that of the gases passing through the blade ring and said cooling fluid being passed into close thermal contact with at least one of said closely fitting parts, namely, said guide element and adjacent portions of the blades to cause differential thermal expansion between the parts, the said parts being so dimensioned that said guide element frictionally locks each blade against rotational movement on its longitudinal axis when cooled by said cooling fluid and in the absence of such cooling fluid the blades are respectively free to rotate on their longitudinal axes.

6. A turbine stator blade assembly including a fixed stator structure, a ring of variable incidence stator blades, each blade being pivotally mounted in said structure for pivotal movement about an axis extending substantially radially to the rotary axis of the turbine, means for adjusting the respective blades about their axis, a fixed guide element of thermally expansible material, said element being supported in said structure for radial expansion and contraction relative to said ring of blades for movement into and from locking frictional engagement with the respective blades, and means for selectively delivering a cooling fluid into close thermal contact with said element.

7. A stator blade assembly for a gas turbine including a fixed annular frame member, a ring of variable incidence stator blades supported on said frame member for pivotal adjustment about axes disposed substantially radially to the center of said member, said blades being disposed respectively in the path of flow of hot gases through said turbine, a locking ring of thermally expansible metal supported on said member coaxially with respect to said ring of blades for radial expansion and contraction relative to said blades into and from locking frictional engagement with radially presented portions of said blades, and means for selectively changing the temperature of said locking ring to expand or contract same.

8. The combination defined in claim 7 wherein said last-mentioned means comprises a means for selectively supplying a cooking fluid into heat-exchanging relation with said locking ring.

9. The combination of elements as defined in claim 7 wherein said locking ring is encircled by the inner end portions of said ring of blades, with its radially outer face defining and serving to confine the path of flow of hot gases through said turbine, and in heat-exchanging relation with said gases, the radially outwardly directed portion of said locking ring cooperating with said frame member to define an annular chamber for reception of a cooling fluid, and means for selectively supplying the cooling fluid into said chamber in heat-exchanging relation with the locking ring.

References Cited in the file of this patent

UNITED STATES PATENTS

| | | |
|---|---|---|
| 2,651,492 | Feilden | Sept. 8, 1953 |
| 2,671,634 | Morley | Mar. 9, 1954 |
| 2,862,687 | Aguet et al. | Dec. 2, 1958 |